US007631303B2

(12) United States Patent
Debertin et al.

(10) Patent No.: US 7,631,303 B2
(45) Date of Patent: Dec. 8, 2009

(54) SYSTEM AND METHOD FOR A QUERY LANGUAGE MAPPING ARCHITECTURE

(75) Inventors: Dirk Debertin, Karlsruhe (DE); Rainer Schweigkoffer, Mannheim (DE)

(73) Assignee: SAP Aktiengesellschaft, Walldorf (DE)

( * ) Notice: Subject to any disclaimer, the term of this patent is extended or adjusted under 35 U.S.C. 154(b) by 536 days.

(21) Appl. No.: 10/862,915

(22) Filed: Jun. 7, 2004

(65) Prior Publication Data
US 2006/0004831 A1  Jan. 5, 2006

(51) Int. Cl.
*G06F 9/45*  (2006.01)
(52) U.S. Cl. .................................. 717/144; 707/3; 707/4
(58) Field of Classification Search ....................... 707/3, 707/4; 717/144
See application file for complete search history.

(56) References Cited

U.S. PATENT DOCUMENTS

| | | | | |
|---|---|---|---|---|
| 5,875,334 | A * | 2/1999 | Chow et al. | 717/141 |
| 6,269,373 | B1 * | 7/2001 | Apte et al. | 707/10 |
| 6,351,776 | B1 * | 2/2002 | O'Brien et al. | 709/245 |
| 6,941,298 | B2 * | 9/2005 | Chow et al. | 707/3 |
| 7,103,613 | B2 * | 9/2006 | Nouri | 707/103 R |
| 2003/0149689 | A1 * | 8/2003 | Chow et al. | 707/3 |
| 2003/0163460 | A1 * | 8/2003 | Shinn et al. | 707/3 |
| 2003/0167261 | A1 * | 9/2003 | Grust et al. | 707/3 |
| 2003/0182273 | A1 | 9/2003 | Goldberg | |
| 2003/0196195 | A1 | 10/2003 | Sluiman | |
| 2005/0262135 | A1 * | 11/2005 | White | 707/103 R |
| 2007/0192336 | A1 * | 8/2007 | Iyer et al. | 707/100 |

OTHER PUBLICATIONS

BEA Systems, "Understanding Enterprise Java Beans" Oct. 11, 2003, edocs.bea.com/wls/docs81/ejb/entity.html.*
Final Office Action for U.S. Appl. No. 10/863,127, Mailed Feb. 19, 2009, Whole document.
Office Action for U.S. Appl. No. 10/863,127, Mailed Oct. 19, 2006, Whole document.
Final Office Action for U.S. Appl. No. 10/863,127, Mailed Apr. 4, 2007, Whole document.
Office Action for U.S. Appl. No. 10/863,127, Mailed Aug. 10, 2007, Whole document.
Final Office Action for U.S. Appl. No. 10/863,127, Mailed Feb. 1, 2008, Whole document.
Office Action for U.S. Appl. No. 10/863,127, Mailed Jun. 12, 2008, Whole document.
Rosenburg, Dave, "Bringing Java to the Enterprise: Oracle on its Java Server Strategy", Bringing Java to the Enterprise: Oracle on its Java Server Strategy, Mar./Apr. 1998 IEEE, http://ieeexplore.ieee.org/iel4/4236/14762/00670684.pdf?tp=&arnumber=670684&isnumber=14762, (1998).

* cited by examiner

*Primary Examiner*—Wei Y Zhen
*Assistant Examiner*—Matthew J Brophy
(74) *Attorney, Agent, or Firm*—Blakely, Sokoloff, Taylor & Zafman LLP

(57) ABSTRACT

A system and method are provided for a query language mapping architecture. In an embodiment, the query language mapping architecture includes an Enterprise Java Bean (EJB) interpreting layer to receive one or more EJB persistence requests and to translate the one or more EJB persistence requests to command sequences. In an embodiment, the query language mapping architecture may also include a Structured Query Language (SQL) assembly layer to receive the command sequences from the EJB interpreting layer and to assemble one or more SQL statements based, at least in part, on the command sequences.

7 Claims, 9 Drawing Sheets

SYSTEM AND METHOD FOR A QUERY LANGUAGE MAPPING ARCHITECTURE

TECHNICAL FIELD

Embodiments of the invention generally relate to the field of data processing and, more particularly, to a system and method for a query language mapping architecture.

BACKGROUND

Many businesses are providing access to their products and services through applications that are delivered over computer networks such as the Internet. These applications typically have a multi-tiered architecture. In those cases where the applications are delivered over the Internet they are commonly referred to as Web-based applications. FIG. 1 is a block diagram of a Web-based application 100 having a multi-tiered architecture.

Web-based application 100 includes client layer 110, application layer 120, and database layer 130. Client layer 110 includes user interface 112 that runs on a client computing device such as a desktop computer, laptop computer, personal digital assistant, telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP), HTTP secured through the Secure Socket Layer, the Simple Object Access Protocol (SOAP), and the like. Presentation logic 142 generates a Graphical User Interface (GUI) using, for example, a markup language such as the HyperText Markup Language (HTML). Business logic 144 represents the core of the application, for example, the rules governing the underlying business process (or other functionality) provided by the application. Database interface layer 146 provides an interface to database layer 130. The Java 2 Enterprise Edition Specification v1.3, published on Jul. 27, 2001 (the J2EE Standard) defines an increasingly popular architecture for application layer 120.

Database layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database.

In some cases, business logic 144 may be implemented with Enterprise Java Beans (EJBs). EJBs are server-side J2EE components that provide business logic and represent persistent data. Although EJBs provide a flexible architecture for business logic 144, they also introduce a certain amount of complexity.

FIG. 2 is a block diagram of distributed system 200 illustrating some of the complexity of implementing business logic 210 with EJBs 211-216. EJBs 211-216 are developed from an objected-oriented point-of-view. That is, objects are typically accessed by identifying a first object as a starting point and finding additional objects by, for example, following references or calling methods. In contrast, database 220 is typically organized according to a completely different organizational model that is based on set-oriented query and update statements.

Conventional mapping architecture 230 attempts to map the object-oriented domain of business logic 210 to the relational domain of database 220. Conventional mapping architecture 230 is typically only able to process a limited set of the queries that are generated by business logic 210. In addition, conventional mapping architecture 230 is typically constrained to interoperating with a database provided by a particular vendor.

SUMMARY OF THE INVENTION

A system and method are provided for a query language mapping architecture. In an embodiment, the query language mapping architecture includes an Enterprise Java Bean (EJB) interpreting layer to receive one or more EJB persistence requests and to translate the one or more EJB persistence requests to command sequences. In an embodiment, the query language mapping architecture may also include a Structured Query Language (SQL) assembly layer to receive the command sequences from the EJB interpreting layer and to assemble one or more SQL statements based, at least in part, on the command sequences.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A system and method are provided for a query language mapping architecture. In an embodiment, the query language mapping architecture includes an Enterprise Java Bean (EJB) interpreting layer to receive one or more EJB persistence requests and to translate the one or more EJB persistence requests to command sequences. In an embodiment, the query language mapping architecture may also include a Structured Query Language (SQL) assembly layer to receive the command sequences from the EJB interpreting layer and to assemble one or more SQL statements based, at least in part, on the command sequences.

Figure 1:
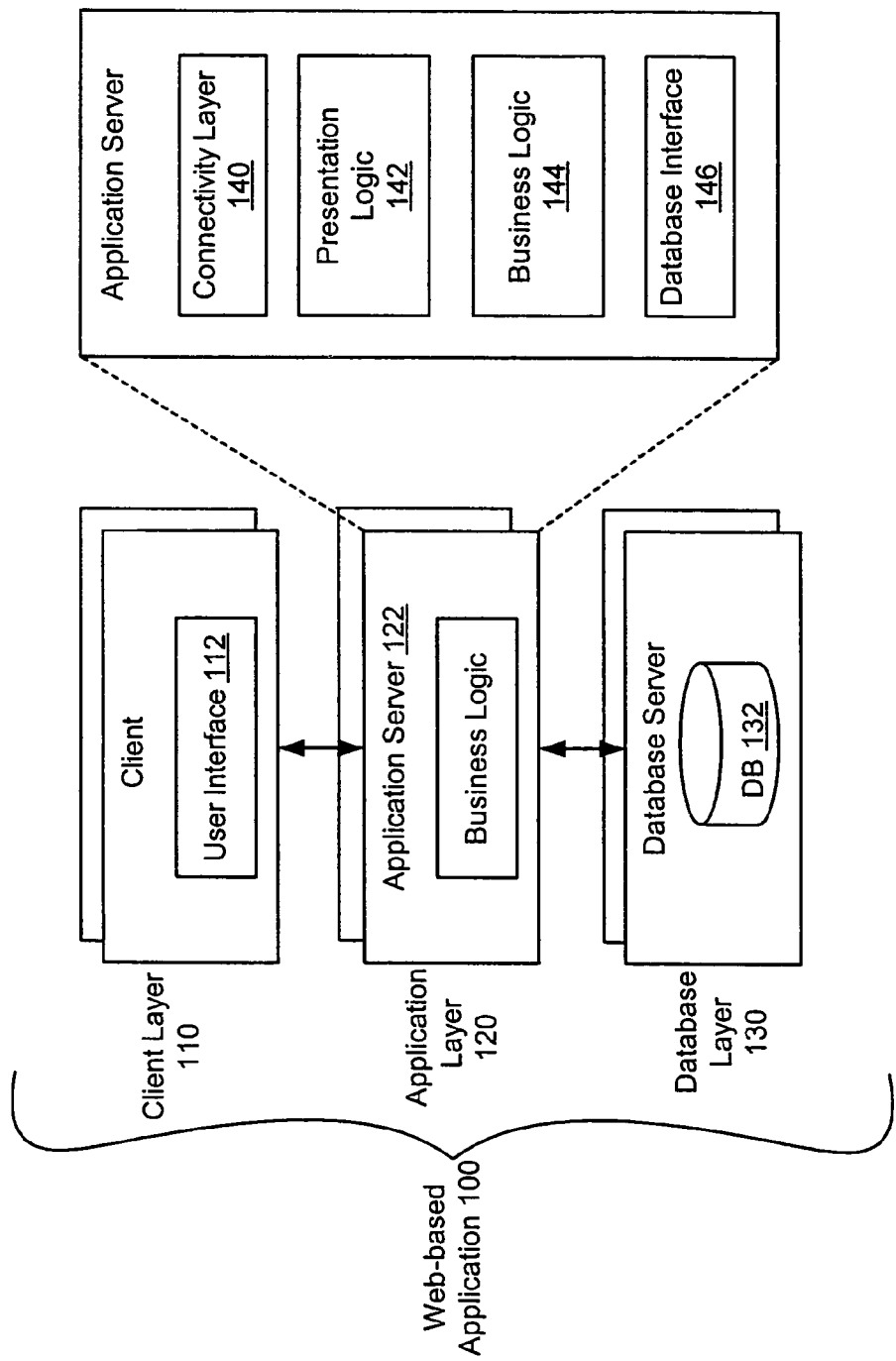
FIG. 1 is a block diagram of a Web-based application having a multi-tiered architecture.
Figure 2:
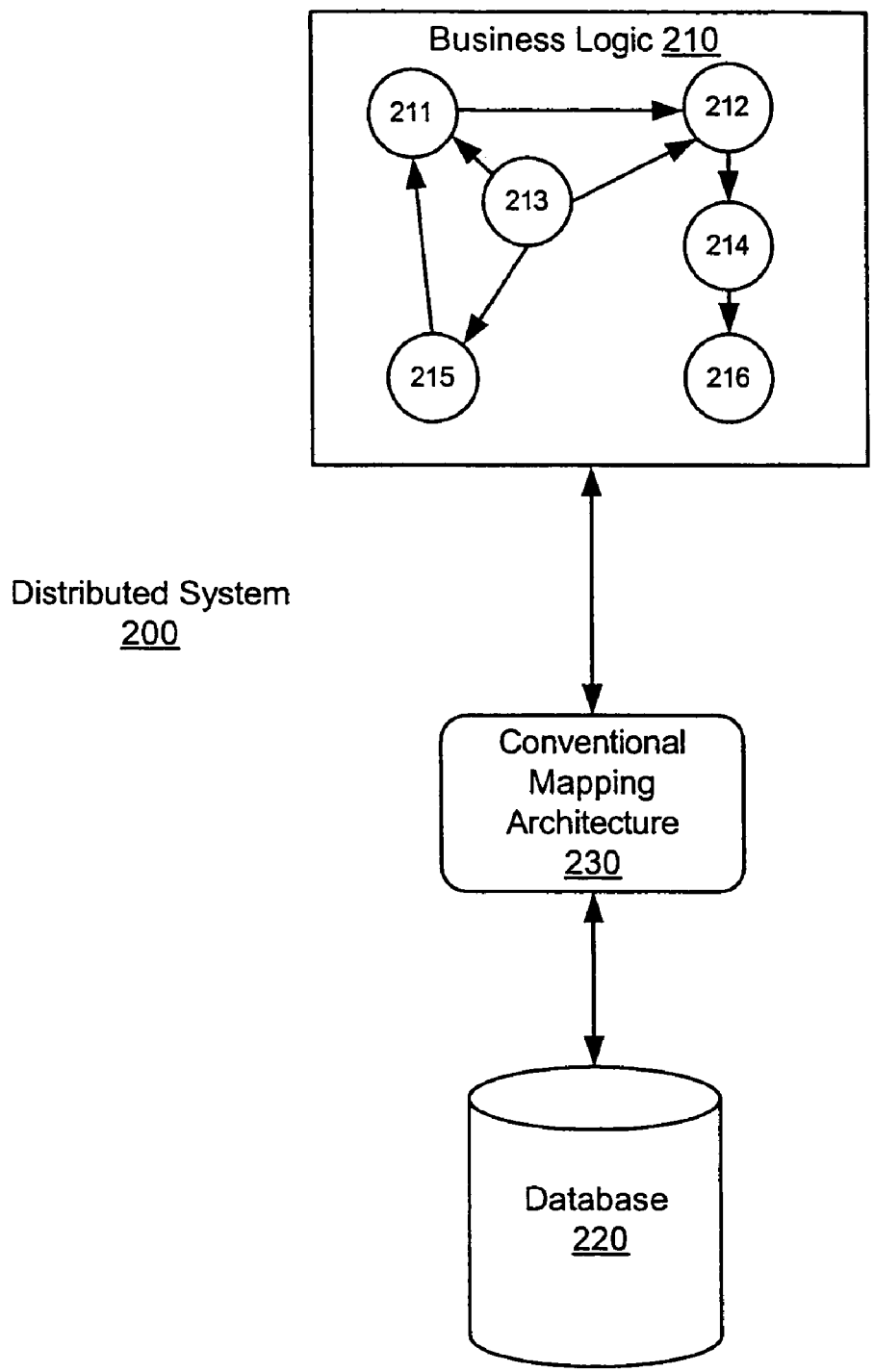
FIG. 2 is a block diagram of a distributed system that illustrates some of the complexity of implementing business logic with Enterprise Java Beans (EJBs).
Figure 3:
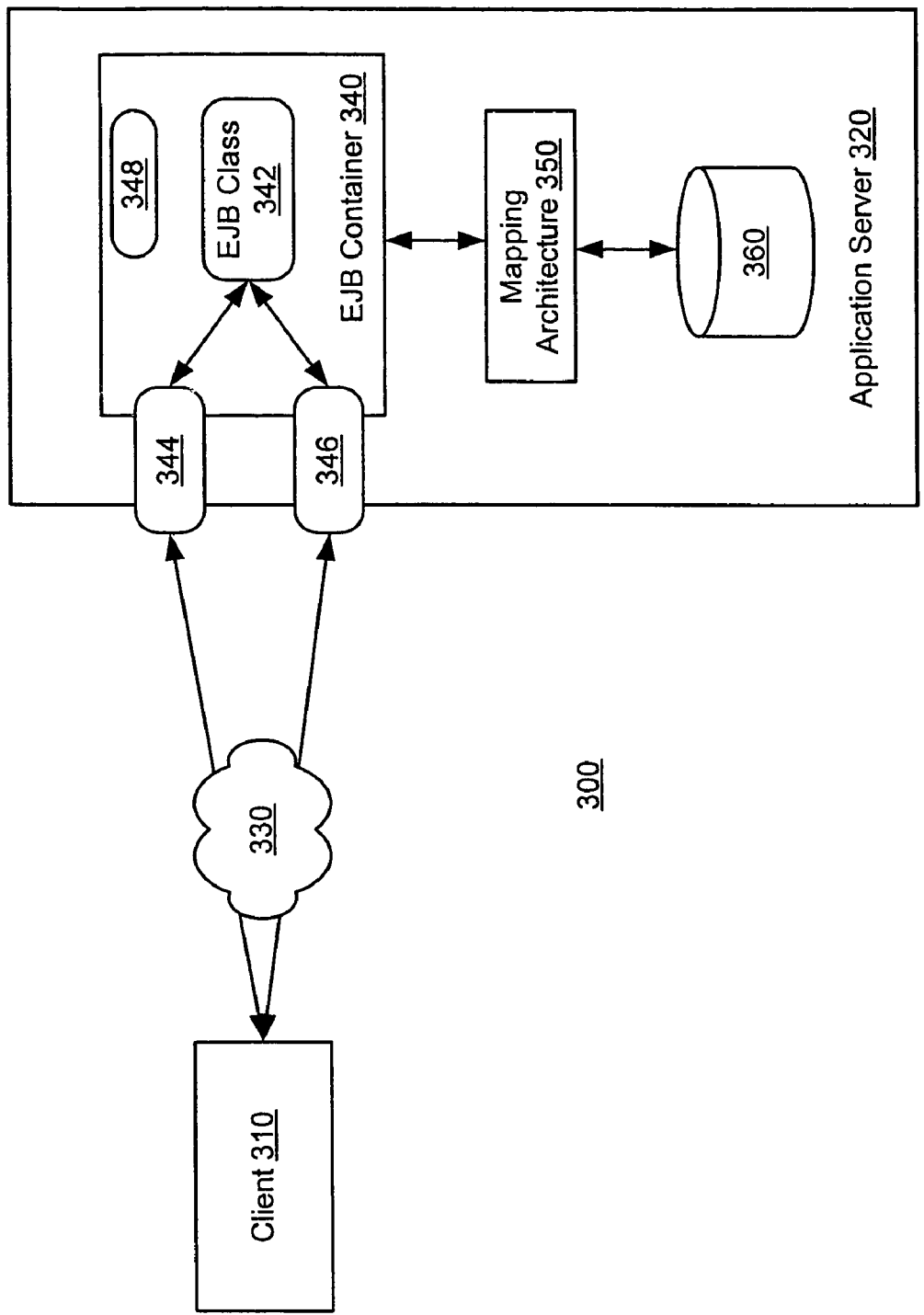
FIG. 3 is a block diagram illustrating a distributed system implemented according to an embodiment of the invention.

FIG. 3 is a block diagram illustrating distributed system 300 implemented according to an embodiment of the invention. Distributed system 300 includes client 310 and application server 320. Client 310 may collect input from a user and provide that input to application server 320 via network 330 for processing. Client 310 may be, for example, a desktop computer, a laptop computer, a personal digital assistant, a telephone, an application server, and the like. Network 330 may be, for example, any combination of a wired or wireless Local Area Network (LAN), Wide Area Network (WAN), Metropolitan Area Network (MAN), intranet, and/or the Internet.

Application server 320 receives information from client 310 and may generate a response after processing the information. In an embodiment, application server 320 is based, at least in part, on the J2EE standard (e.g., IBM's Websphere platform). In an alternative embodiment, application server 320 may be based on a different platform such as Microsoft Corporation's .Net platform. The illustrated embodiment of application server 320 includes EJB container 340, mapping architecture 350, and database 360. In an alternative embodiment, application server 320 may include more elements, fewer elements, and/or different elements.

EJB container 340 is the environment in which EJBs reside. EJB container 340 enables multiple EJBs to be deployed to application server 320 and makes them accessible through a naming service such as the Java Naming and Directory Interface (JNDI). EJB container 340 provides deployed beans with services such as persistence, transaction handling, pooling, security, exception handling, and the like. At runtime, EJB container 340 creates instances of the bean class (e.g., bean class instance 342) and manages the lifecycle of the instances of the bean class.

An EJB typically has four basic elements: instance of the bean class 342, object interface 344, home interface 346, and deployment descriptor 348. Bean class 342 implements business methods that may be declared in, for example, object interface 344. Home interface 346 may define one or more methods used by client 310 to find and/or remove bean class 342. Deployment descriptor 348 may be an eXtensible Markup Language (XML) file containing metadata that for example, describes an EJB's structure and its relationships to other EJBs. An entity EJB is an EJB that represents specific data or collections of data such as a row in a relational database (e.g., database 360).

In an embodiment, mapping architecture 350 receives persistency requests from EJB container 340 and generates Structured Query Language (SQL) statements based, at least in part, on the received persistency requests. EJB container 340 may use the generated SQL statements to, for example, implement Container Managed Persistence (CMP).

In an embodiment, the persistency requests received by mapping architecture 350 may be grouped into two categories: user-defined EJB Query Language (EJBQL) persistency requests and EJB container persistency requests. In an embodiment, user-defined EJBQL persistency requests may be based, at least in part, on ejbSelect( ) methods and ejbFinder( ) methods. Similarly, in an embodiment, EJB container persistency requests may be based, at least in part, on ejbLoad( ) methods, ejbStore( ) methods, and/or ejbRemove( ) methods as well as methods for manipulating and maintaining Container Managed Relationships (CMRs). Mapping architecture 350 is further described below with reference to FIGS. 4-7.

Figure 4:
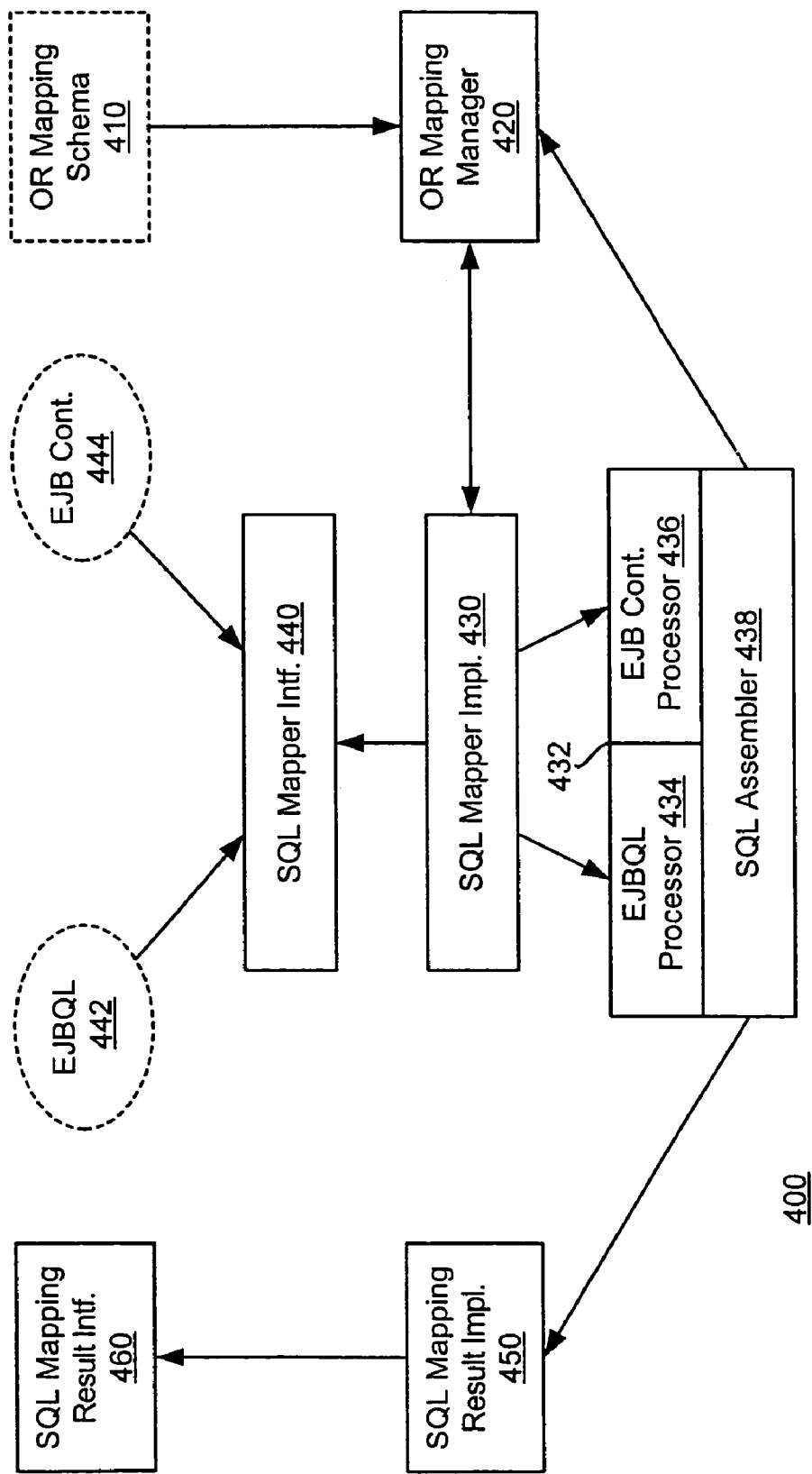
FIG. 4 is a block diagram of selected aspects of a mapping architecture, implemented according to an embodiment of the invention.

FIG. 4 is a block diagram of selected aspects of mapping architecture 400, implemented according to an embodiment of the invention. In an embodiment, mapping architecture 400 receives persistence requests from an EJB container (e.g., EJB container 340, shown in FIG. 3), generates SQL statements based, at least in part, on the persistence requests, and provides the SQL statements to the EJB container (e.g., via SQL mapping result interface 460).

In an embodiment, mapping architecture 400 is assigned an Object/Relational (OR) mapping schema 410 to determine the mapping between, for example, entity EJBs, database tables (e.g., the tables of database 360, shown in FIG. 3), and Container Managed Relations (CMRs). In an embodiment, mapping architecture 400 wraps OR mapping schema 410 into OR mapping manager 420. Mapping manager 420 may transform the data provided by OR mapping schema 410 into the form used by the classes of mapping architecture 400. In addition, mapping manager 420 may cache a derived form of the data (or a portion of the data) to increase the performance of mapping architecture 400. In one embodiment, the methods of various elements of mapping architecture 400 (e.g., the methods of OR mapping manager 420) are thread safe.

In an embodiment a catalog reader may validate the data in OR mapping schema 410 against an underlying database (e.g., database 360, shown in FIG. 3). In such an embodiment, OR mapping manager 420 may provide a catalog interface. The catalog interface may be implemented with a number of classes including, for example, an ORMapCatalogReader class, an ORMapColumnIterator class, a TableDescriptor class, and/or a ColumnDescriptor class.

In an embodiment, SQL mapper implementation 430 provides a number of interfaces and classes to implement the core functionality of mapping architecture 400. For example, in an embodiment, SQL mapper implementation 430 provides SQL mapper interface 440 to receive persistence requests from an EJB container (e.g., EJB container 340, shown in FIG. 3). In one embodiment, the received requests may include EJBQL persistence requests 442 and/or EJB container persistence requests 444. In an embodiment, SQL mapper interface 440 passes the received persistence requests to SQL mapper implementation 430 for processing.

In an embodiment, SQL mapper implementation 430 employs a two-layer set of classes to process persistence requests that it receives from SQL mapper interface 440. For example, the illustrated embodiment of SQL mapper implementation 430 includes EJB interpreting layer 432 and SQL assembly layer 438. In one embodiment, the purpose of EJB interpreting layer 432 is to interpret received EJB persistence requests and to send a sequence of commands (e.g., method calls) to the SQL assembly layer 438. In an embodiment, the purpose of SQL assembly layer 438 is assemble SQL statements based, at least in part, on the sequence of commands received from EJB interpreting layer 432.

In an embodiment, EJB interpreting layer 432 is divided into two sections: EJBQL persistence request processor 434 (or, for ease of discussion, EJBQL processor 434) and EJB container persistence request processor 436 (or, for ease of discussion, EJB container processor 436). In such an embodiment, the purpose of EJBQL processor 434 is to interpret EJBQL persistence requests and to send a sequence of commands to SQL assembly layer 438 based, at least in part, on the persistence requests. Similarly, the purpose of EJB container processor 436 may be to interpret EJB container persistence requests and send a sequence of commands to SQL assembly layer 438 based, at least in part, on the persistence requests. SQL mapper implementation 430 is further discussed below with reference to FIGS. 5-7.

In an embodiment, the output of SQL mapper implementation 430 is described by SQL mapping result implementation 450. In one embodiment, the SQL statement(s) provided by SQL mapping result implementation 450 are organized as a tree structure in which each element of the SQL statement is represented by a node of the tree structure. Organizing the information in a tree structure enhances the processing of persistence requests by providing a more efficient, more complete, and reusable presentation of data related to a persistence request (e.g., data source, type of statement, conditional clauses, etc.). An example of an SQL statement organized as a tree structure is shown below with reference to FIG. 6.

In one embodiment, the SQL statement(s) provided by SQL mapping result implementation 450 are database-independent. The term "database-independent" refers to, for example, an SQL statement that is portable across a number of databases provided by a number of different vendors. In such an embodiment, SQL mapper implementation 430 may map a received persistence request to an SQL statement that is known to be database-independent. For example, in an embodiment, a set of SQL statements may be chosen that are a subset of standard SQL-92 statements, for example, a subset of statements that comply with the American National Standards Institute/International Organization or Standardization (ANSI/ISO) 9075: 1992 Information Technology—Database Languages—SQL standard (hereinafter, the SQL-92 Standard). The subset of standard SQL-92 statements may be selected, at least in part, based on whether they are database-independent. In one embodiment, the subset of standard SDQ-92 statements is supplemented with additional SQL statements that are known to be database-independent.

In an embodiment, SQL mapping result implementation 450 implements mapping result interface 460 to provide the SQL mapping result to an EJB container (e.g., container 340, shown in FIG. 3). Mapping result interface 460 may provide an implementation of one or more methods that provide access to an SQL mapping result and/or manipulation of an SQL mapping result. For example, in an embodiment, mapping result interface 460 may provide a method to determine whether an SQL mapping result is database-independent.

In an embodiment, SQL mapping result implementation 450 may derive database-specific SQL statements for given database vendors from its internal database-independent SQL statement representation. For example, one or more methods may be provided that allow an end-user (or program) to specify a specific database (e.g., via a database product name and/or a database vendor identifier). In an embodiment, the one or more methods may be used by SQL mapping result implementation 450 to derive an SQL statement string representation of the SQL statement that is specific to the identified database.

Figure 5:
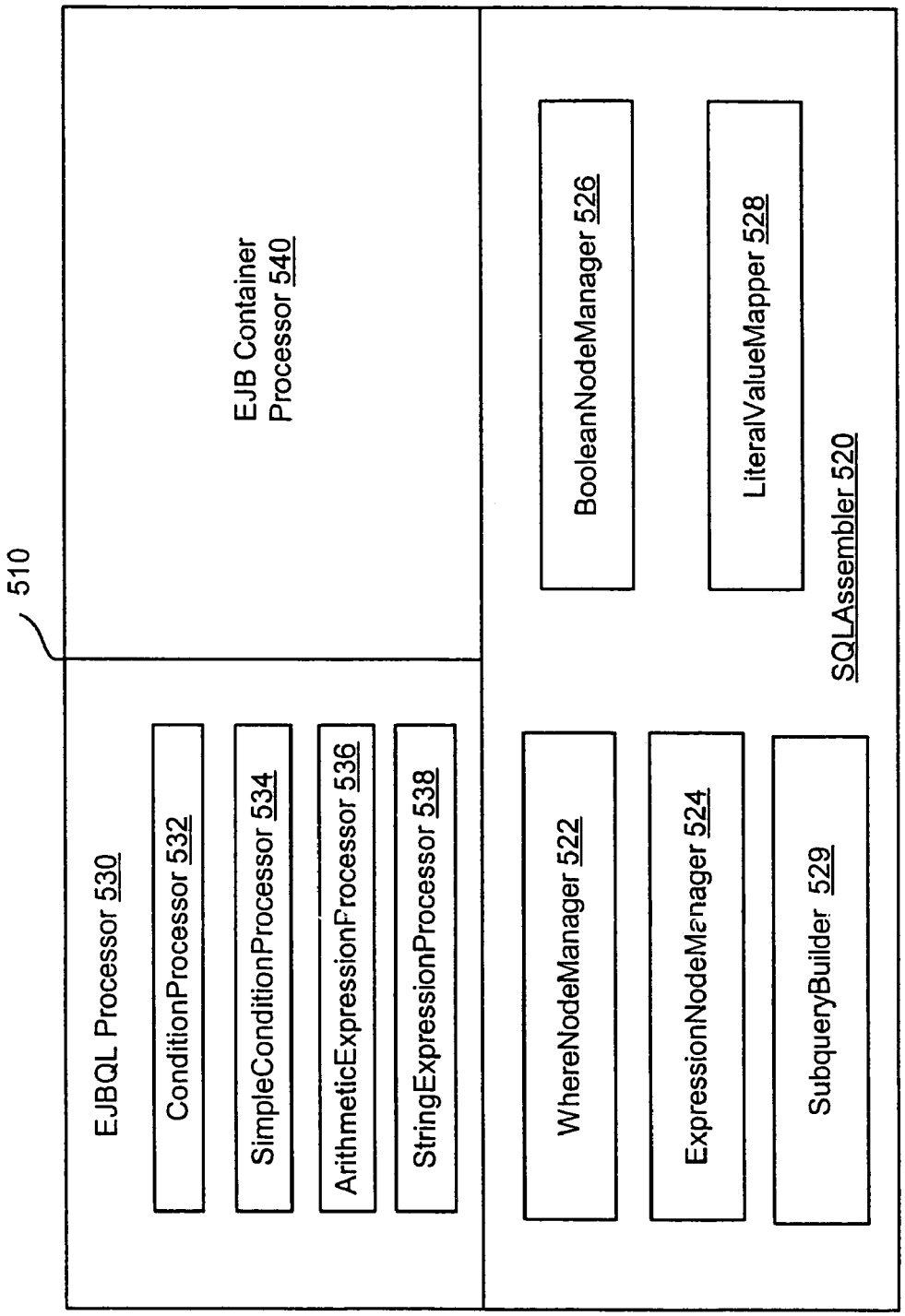
FIG. 5 is a block diagram of selected aspects of an SQL mapper implementation, implemented according to an embodiment of the invention.

FIG. 5 is a block diagram of selected aspects of SQL mapper implementation 500, implemented according to an embodiment of the invention. The illustrated embodiment includes EJB interpreting layer 510 and SQL assembly layer 520. In an alternative embodiment of the invention, SQL mapper implementation 500 may include more elements, fewer elements, and/or different elements than those depicted in FIG. 5.

In an embodiment, EJB interpreting layer 510 includes EJBQL processor 530 to interpret EJBQL persistence requests. In one embodiment, the received EJBQL persistence requests are organized as tree structures in which each element of the persistence request is represented by a node of the tree structure. In such an embodiment, EJQL processor 530 traverses the tree structure representing the EJBQL persistence request and transforms the information it encounters into appropriate method calls to underlying SQL assembly layer 520. In an embodiment, SQL assembly layer 520 assembles an SQL statement in a step-wise fashion as it receives the method calls from EJBQL processor 530. In such an embodiment, once EJBQL processor 530 has completely traversed the tree structure representing the persistence request, SQL assembly layer 520 has completely assembled, for example, an SQL statement representing the original EJBQL persistence request.

In an embodiment, EJBQL processor 530 employs a number of classes to interpret the received persistence request. For example, the illustrated embodiment includes ConditionProcessor class 532, SimpleConditionProcessor class 534, ArithmeticExpressionProcessor class 536, and StringExpressionProcessor class 538. In an embodiment, ConditionProcessor class 532 interprets combined conditions of a WHERE clause within the received persistence request. Similarly, SimpleConditionProcessor class 534 may interpret elementary conditions (as well as simple arithmetic and Boolean conditions) of the WHERE clause. In an embodiment, ArithmeticExpressionProcessor class 536 may be used to interpret more complex arithmetic expressions. In an embodiment, StringExpressionProcessor class 538 may be used to interpret one or more of the string expressions in a persistence request. SQL mapper implementation is easy-to-extend because, for example, new classes may be added to one or more of its layers to extend the functionality of the layer.

In an embodiment, EJB interpreting layer 510 includes EJB container processor 540 to process persistence requests from an EJB container (e.g., EJB container 340, shown in FIG. 3). The EJB container persistence requests may be directed to loading, storing, and removing EJBs as well as manipulating and maintaining Container Managed Relations (CMRs) between EJBs. In an embodiment, EJB container processor 540 receives EJB container persistence requests and, for each type of persistence request, sends a sequence of commands to SQL assembly layer 520. In an embodiment, the sequence of commands sent by the EJB container processor 540 are similar to those sent by EJBQL processor 530. In an embodiment, the sequence of commands is extended to handle the persistence requests directed to CMRs that may be received from the container.

SQL assembly layer 520 assembles SQL statements based, at least in part, on the commands (e.g., method calls) that it receives from EJB interpreting layer 510. In an embodiment, SQL assembly layer 520 provides a tree representation of the assembled SQL statement. In an embodiment, SQL assembly layer 520 employs one or more classes to assemble an SQL statement. For example, WhereNodeManager class 522 may generate a subtree of logic predicates representing an SQL statement's WHERE clause. In an embodiment, ExpressionNodeManager class 524 compiles the expressions used within those predicates.

Certain versions of the Java Database Connectivity (JDBC) Application Program Interface (API) may not support Boolean expressions (e.g., versions earlier than JDBC ver. 3.0). BooleanNodeManager class 526 may provide mappings to alternative expressions when mapping to Boolean expressions is not supported by the JDBC API. For example, if a WHERE predicate's right operand expression is to inherit type mapping from its corresponding left operand expression, BooleanNodeManager class 526 may support the type mapping. In an embodiment, Boolean literal values may be appropriately transformed in accordance with a prevailing type mapping. In such an embodiment, LiteralValueMapper class 528 may provide the appropriate transformation. Some constructs of a persistence request may involve the use of subqueries within an SQL statement. In an embodiment, SubqueryBuilder class 529 generates subqueries, as needed, for the SQL statement.

Figure 6A:
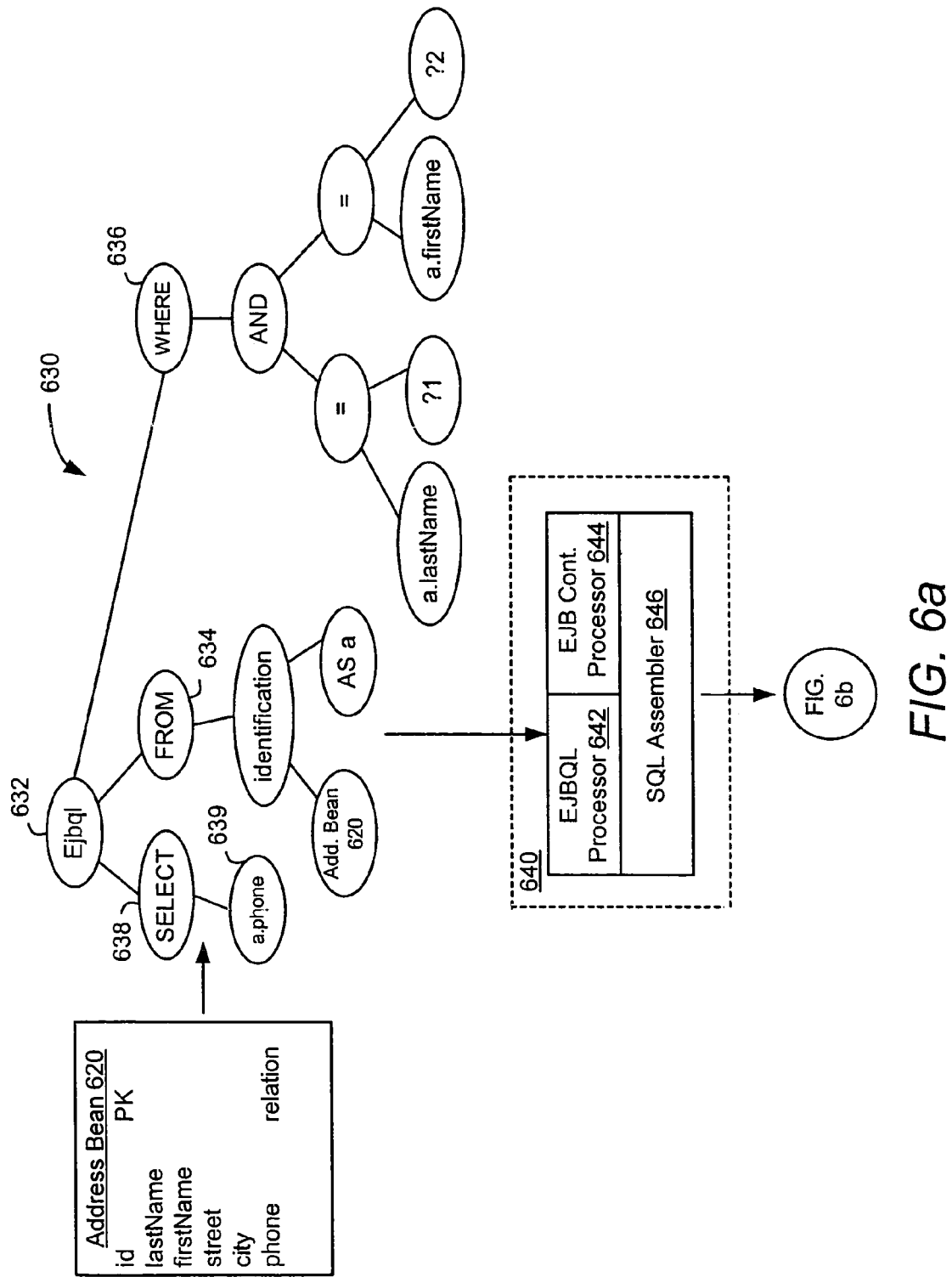
FIG. 6 is a conceptual illustration of generating an SQL statement, according to an embodiment of the invention.
Figure 6B:
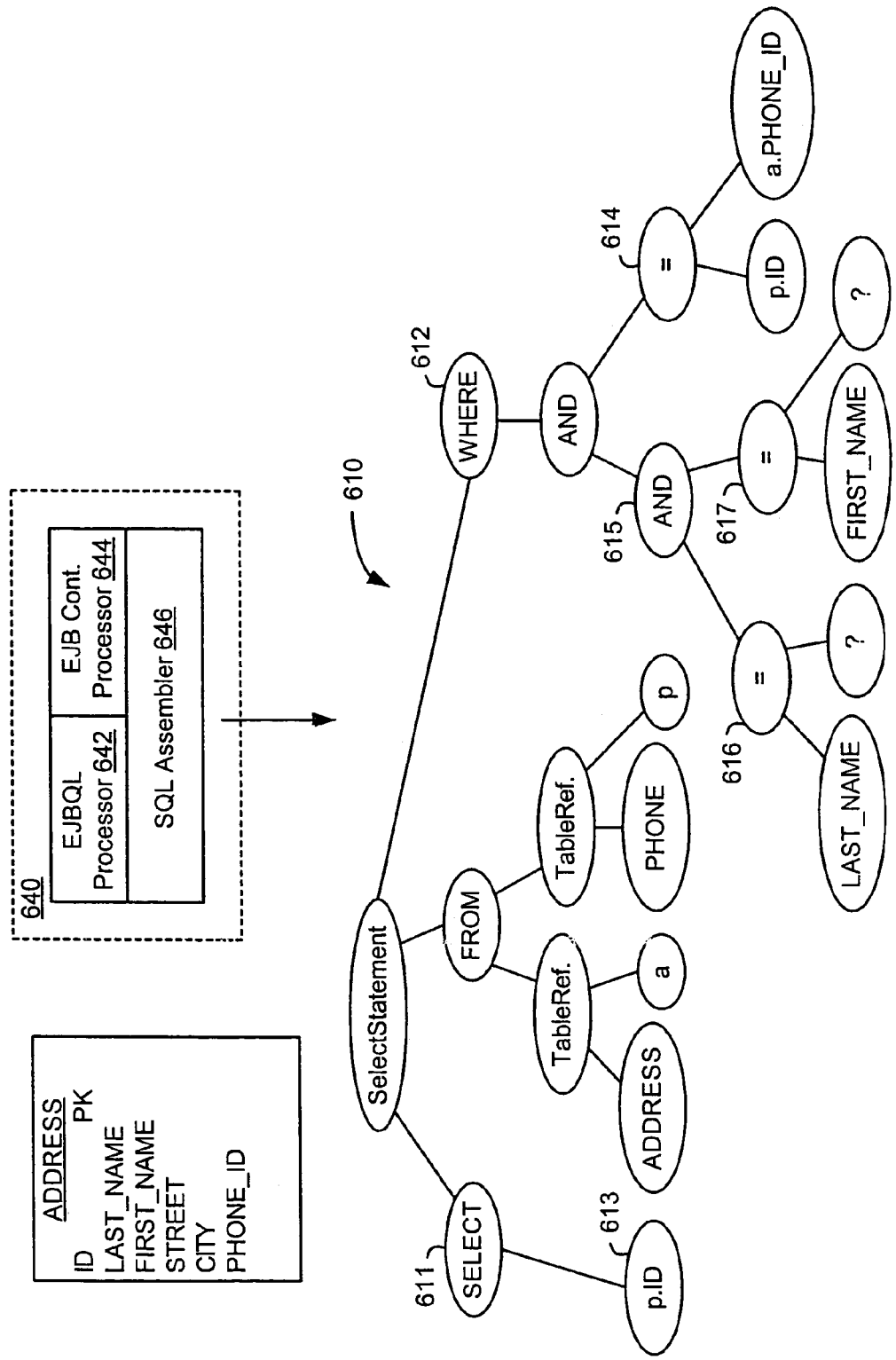

FIG. 6 is a conceptual illustration of generating SQL statement 610, according to an embodiment of the invention. In an embodiment, an EJB may include a number of user-defined EJBQL persistence requests (e.g., defined in the deployment descriptor of the EJB). Listing 1 shows an illustrative user-defined EJBQL persistence request corresponding to FIG. 6

Listing 1

SELECT a.phone FROM AddressBean AS a
WHERE a.lastName=?1 AND a.firstName=?2

In an embodiment, an EJBQL parser (not shown) parses, for example, the persistence request shown in Listing 1 and generates a tree structure representation of the persistence request as shown by EJBQL tree structure 630. In an embodiment, each node of EJBQL tree structure 630 represents an element of the persistence request shown in Listing 1. For example, EJBQL node 632 may represent the EJBQL persistence request generally while from node 634 and where node 636 represent the FROM clause and WHERE clause of the EJBQL persistence request. In an embodiment, relationships between EJBs may be also be represented by EJBQL tree structure 630. For example, a.phone node 639 may represent a relationship between address bean 620 and another EJB (not shown).

In an embodiment, SQL mapper implementation 640 receives an EJBQL persistence request such as, for example, EJBQL tree structure 630. SQL mapper implementation 640 may include EJBQL processor 642, EJB container processor 644, and SQL assembler 646. Since EJBQL tree structure 630 represents a user-defined EJBQL statement, in an embodiment, it may be interpreted by EJBQL processor 642. In an embodiment, EJBQL processor 642 traverses EJBQL tree structure 630 (e.g., with the help of classes such as 532-538, shown in FIG. 5) and generates a command(s) (e.g., method call(s)) for each node of tree structure 630.

In an embodiment, SQL assembler 646 generates SQL tree structure 610 in a step-wise fashion as it receives the command sequence from EJBQL processor 642. For example, as EJBQL processor 642 traverses select node 638 and where node 636, SQL assembler 646 may generate select node 611 and p.ID node 613 (representing the primary key of the other EJB (not shown) to which the relation phone of EJB AddressBean 620 is pointing) as well as where node 612 and AND node 615 and an equal join condition node 614 to realize the relation phone of EJB AddressBean 620. In an embodiment, SQL assembler 646 generates node elements for SQL tree structure 610 that are database-independent (e.g., elements selected from a subset of SQL-92 that are database-independent). In an alternative embodiment, SQL assembler 646 may generate platform-independent and/or platform dependent SQL statements.

Figure 7:
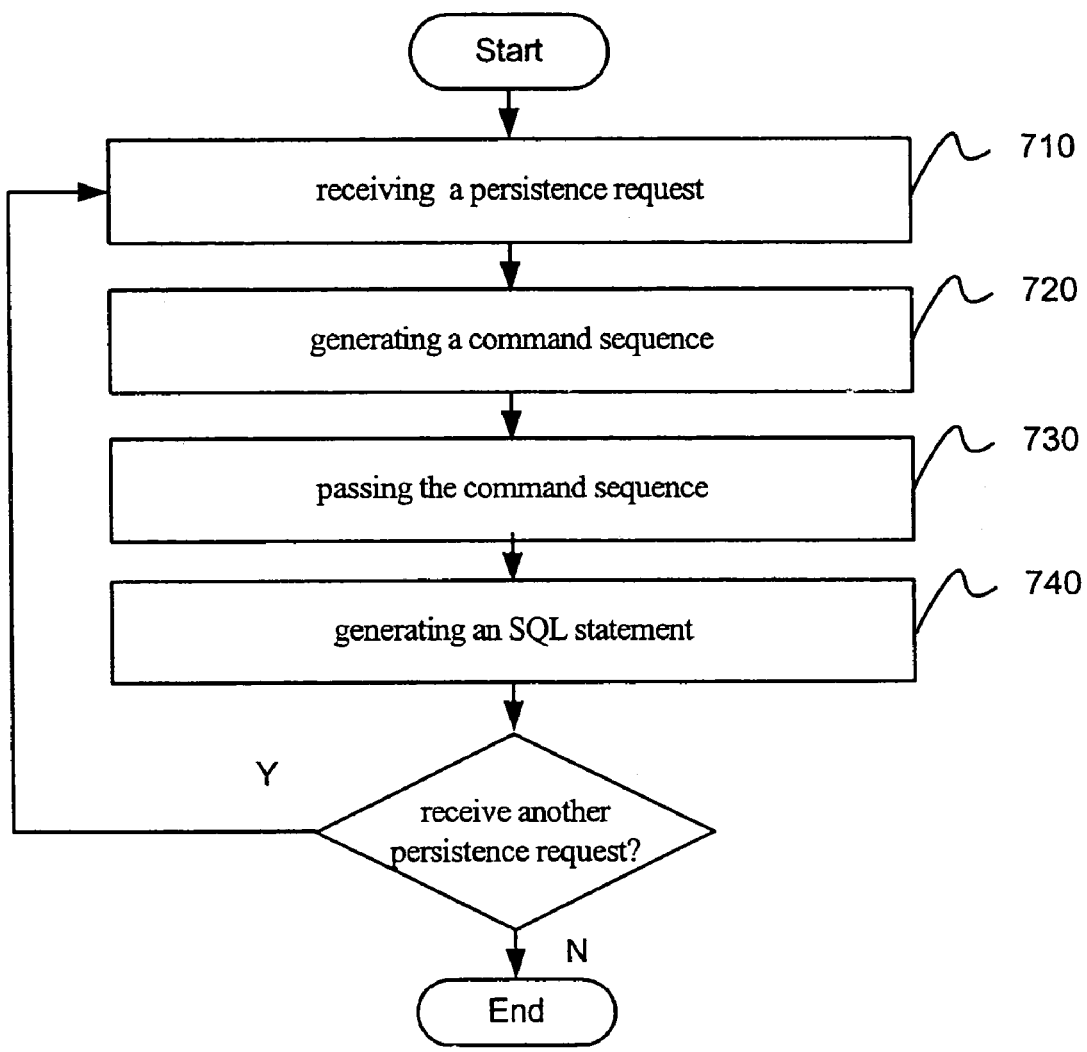
FIG. 7 is a flow diagram illustrating selected aspects of a method for generating SQL statements, according to an embodiment of the invention.

Turning now to FIG. 7, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flow diagram illustrating selected aspects of a method for generating SQL statements, according to an embodiment of the invention. Referring to process block 710, an SQL mapping implementation (e.g., SQL mapping implementation 430, shown in FIG. 4) receives a persistence request. In an embodiment, the SQL mapping implementation includes an interface (e.g., interface 440, shown in FIG. 4) that receives an EJBQL persistence request and/or an EJB container persistence request.

In an embodiment, the SQL mapping implementation may include an EJB interpreting layer (e.g., EJB interpreting layer 432, shown in FIG. 4) and an SQL assembler layer (e.g., SQL assembler 438, shown in FIG. 4). In an embodiment, the EJB interpreting layer may include an EJBQL processor and an EJB container processor. In such an embodiment, a EJBQL processor may receive the EJBQL persistence request. Similarly, the EJB container persistence request may be received by the EJB container processor.

Referring to process block 720, the EJB interpreting layer generates a command sequence based, at least in part, on the received persistence request. In one embodiment, the EJB interpreting layer traverses a tree structure representation of an EJBQL persistence request and, for each node of the tree structure, calls a method (or methods) to cause the SQL assembler layer to generate a corresponding SQL statement tree node. The command sequence is passed to the SQL assembler layer (via, for example, or more method calls) as shown by reference numeral 730.

Referring to process block 740, the SQL assembler layer generates an SQL statement based, at least in part, on the command sequence from the EJB interpreting layer. In an embodiment, the SQL assembler layer generates the SQL statement in a step-wise fashion (e.g., tree node-by-tree node) as the EJB interpreting layer calls methods that correspond to an element of the persistence request (e.g., a WHERE condition, etc.). In an embodiment, the generated SQL statement is database-independent. In one embodiment, the generated SQL statement is database-dependent. The term database-dependent may refer to an SQL statement having a syntax that is specific to a database provided by a particular database vendor.

Figure 8:
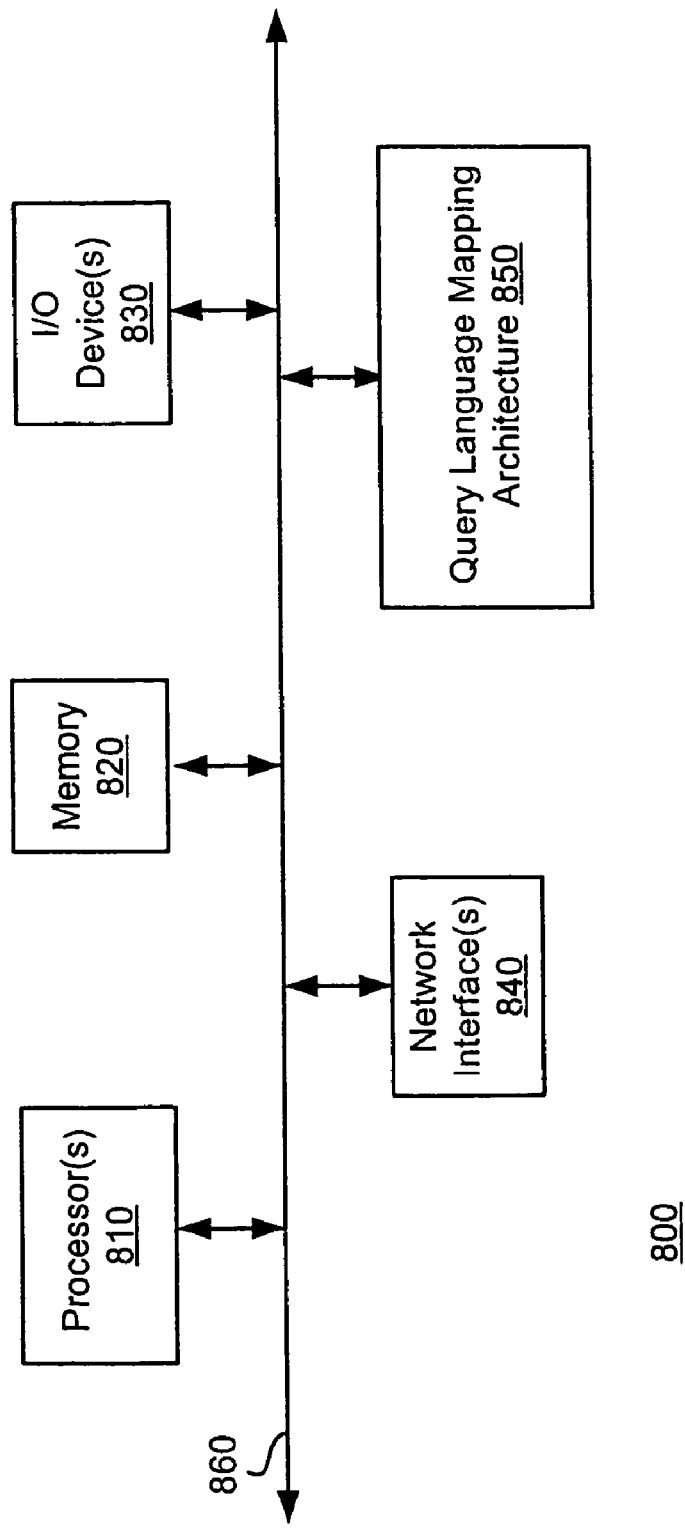
FIG. 8 is a block diagram of a node implemented according to an embodiment of the invention.

FIG. 8 is a block diagram of node 800 implemented according to an embodiment of the invention. Node 800 may include: processor(s) 810, memory 820, one or more Input/Output devices 830, network interface(s) 840, and query language mapping architecture 850. The illustrated elements may be connected together through system interconnection 860. Processor(s) 810 may include a microprocessor, microcontroller, field programmable gate array (FPGA), application specific integrated circuit (ASIC), central processing unit (CPU), programmable logic device (PLD), and similar devices that access instructions from system storage (e.g., memory 820), decode them, and execute those instructions by performing arithmetic and logical operations.

Query language mapping architecture 850 may enable node 800 to map Enterprise Java Bean (EJB) persistence requests to Structured Query Language (SQL) statements. Query language mapping architecture 850 may be executable content, control logic (e.g., ASIC, PLD, FPGA, etc.), firmware, or some combination thereof, in an embodiment of the invention. In embodiments of the invention in which query language mapping architecture 850 is executable content, it may be stored in memory 820 and executed by processor(s) 810.

Memory 820 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 820 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 820 may store program modules such as routines, programs, objects, images, data structures, program data, and other program modules that perform particular tasks or implement particular abstract data types that facilitate system use.

One or more I/O devices 830 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 860 permits communication between the various elements of node 800. System interconnection 860 may include a wide variety of signal lines including one or more of a memory bus, peripheral bus, local bus, host bus, bridge, optical, electrical, acoustical, and other propagated signal lines.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for mapping persistence requests to Structured Query Language (SQL) statements using a two-layer architecture for processing structured persistence requests and object-based container persistence, the method comprising:
   receiving a persistence request at an interpreting layer;
   employing a set of one or more interpreting layer classes selected from the group comprising: a "ConditionProcessor class," a "SimpleConditionProcessor class," an "ArithmeticExpressionProcessor class," and a "StringExpressionProcessor class;"
   generating a command sequence for the persistence request, wherein the command sequence is generated by traversing a first tree structure when the persistence request is a structured persistence request and wherein the command sequence is generated without traversing a tree structure by translating one or more object-based "Load, " Store, " and/or "Remove" method calls when the persistence request is an object-based container persistence request;
   passing the command sequence in step-wise fashion to an SQL assembly layer during traversal of the first tree structure; and
   employing a set of one or more assembly layer classes to assemble a database-independent SQL statement in step-wise fashion based, at least in part, on the command sequence, wherein the assembled database-independent SQL statement is portable across databases from different vendors and wherein each element of the assembled database-independent SQL statement is represented by a node of a second tree structure.

2. The method of claim 1, wherein receiving the persistence request comprises at least one of:
   receiving a structured query language persistence request; and
   receiving the object-based container persistence request.

3. The method of claim 2, wherein receiving the structured query language persistence request comprises at least one of:
   receiving a query language persistence request based, at least in part, on a select method; and
   receiving a query language persistence request based, at least in part, on a finder method.

4. The method of claim 2, wherein receiving the object-based container persistence request comprises at least one of:
   receiving an object-based container persistence request based, at least in part, on a Load method call;
   receiving an object-based container persistence request based, at least in part, on a Store method call;
   receiving an object-based container persistence request based, at least in part, on a Remove method call; and
   receiving an object-based container persistence request based, at least in part, on an container's management of relationship information.

5. A system comprising:
   means for receiving a persistence request at an interpreting layer;
   means for employing a set of one or more interpreting layer classes selected from the group comprising: a "ConditionProcessor class," a "SimpleConditionProcessor class, " an "ArithmeticExpressionProcessor class, " and a "StringExpressionProcessor class; "
   means for generating a command sequence for the persistence request, wherein the command sequence is generated by traversing a first tree structure when the persistence request is a structured persistence request and wherein the command sequence is generated without traversing a tree structure by translating one or more object-based "Load," Store," and/or "Remove" method calls when the persistence request is an object-based container persistence request;

means for passing the command sequence in step-wise fashion to an SQL assembly layer during traversal of the first free structure; and means for employing a set of one or more assembly layer classes to assemble a database-independent SQL statement in step-wise fashion based, at least in part, on the command sequence, wherein the assembled database-independent SQL statement is portable across databases from different vendors and wherein each element of the assembled database-independent SQL statement is represented by a node of a second tree structure.

6. A machine-readable storage medium having instructions stored thereon that, when executed by an apparatus, cause the apparatus to perform a method comprising:

receiving a persistence request at an interpreting layer;

employing a set of one or more interpreting layer classes selected from the group comprising: a "ConditionProcessor class," a "SimpleConditionProcessor class, " an "ArithmeticExpressionProcessOr class," and a "StringExpressionProcessor class;"

generating a command sequence for the persistence request, wherein the command sequence is generated by traversing a first tree structure when the persistence request is a structured persistence request and wherein the command sequence is generated without traversing a tree structure by translating one or more object-based "Load," Store, " and/or "Remove" method calls when the persistence request is an object-based container persistence request;

passing the command sequence in step-wise fashion to an SQL assembly layer during traversal of the first tree structure; and employing a set of one or more assembly layer classes to assemble a database-independent SQL statement in step-wise fashion based, at least in part, on the command sequence, wherein the assembled database-independent SQL statement is portable across databases from different vendors and wherein each element of the assembled database-independent SQL statement is represented by a node of a second tree structure.

7. The machine-readable storage medium of claim 6, wherein receiving the persistence request comprises at least one of:

receiving a structured query language persistence request; and receiving the object-based container persistence request.

* * * * *

UNITED STATES PATENT AND TRADEMARK OFFICE
CERTIFICATE OF CORRECTION

PATENT NO.         : 7,631,303 B2                                              Page 1 of 1
APPLICATION NO.    : 10/862915
DATED              : December 8, 2009
INVENTOR(S)        : Debertin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 710 days.

Signed and Sealed this

Twenty-first Day of December, 2010

David J. Kappos
*Director of the United States Patent and Trademark Office*